(12) United States Patent
Wittig

(10) Patent No.: US 9,752,718 B1
(45) Date of Patent: Sep. 5, 2017

(54) TWO-AXIS JOINT

(71) Applicant: Michael Wittig, Santa Clara, CA (US)

(72) Inventor: Michael Wittig, Santa Clara, CA (US)

(*) Notice: Subject to any disclaimer, the term of this patent is extended or adjusted under 35 U.S.C. 154(b) by 0 days.

(21) Appl. No.: 14/327,437

(22) Filed: Jul. 9, 2014

(51) Int. Cl.
*F16D 3/00* (2006.01)
*F16M 11/20* (2006.01)

(52) U.S. Cl.
CPC .. *F16M 11/2021* (2013.01); *Y10T 403/32041* (2015.01)

(58) Field of Classification Search
CPC ..... Y10T 403/32041; Y10T 403/32049; Y10T 403/32091; Y10T 403/32098; F16M 11/2021; F16M 11/205; F16M 11/2057; F16D 3/20
USPC ........ 403/53, 57, 58, 59, 63, 64, 65; 74/467, 74/471 XY, 473.1, 473.13; 464/106, 113, 464/114
See application file for complete search history.

(56) References Cited

U.S. PATENT DOCUMENTS

| | | | | |
|---|---|---|---|---|
| 14,159 A | * | 1/1856 | Hinkley | F16D 3/20 |
| | | | | 464/106 |
| 1,342,300 A | * | 6/1920 | Sheler | F16D 3/16 |
| | | | | 464/106 |
| 1,899,170 A | * | 2/1933 | Wainwright | F16D 3/32 |
| | | | | 464/125 |
| 2,137,179 A | * | 11/1938 | Nelson | F16D 3/30 |
| | | | | 188/187 |
| 2,236,139 A | * | 3/1941 | Hutchison, Jr. | F16D 7/027 |
| | | | | 416/140 |
| 2,450,984 A | * | 10/1948 | Pastore | B24B 9/161 |
| | | | | 248/904 |
| 2,827,777 A | * | 3/1958 | Molyneux | B64C 27/12 |
| | | | | 416/170 R |
| 2,902,843 A | * | 9/1959 | Forbes | F16D 3/16 |
| | | | | 464/106 |
| 3,084,342 A | * | 4/1963 | Fuller | H01Q 1/18 |
| | | | | 248/485 |
| 3,207,225 A | * | 9/1965 | Shapiro | B64C 27/54 |
| | | | | 416/115 |
| 3,263,477 A | * | 8/1966 | Roper | B21D 53/30 |
| | | | | 72/401 |
| 3,392,597 A | * | 7/1968 | Herrmann | B62D 33/073 |
| | | | | 122/240.1 |
| 3,411,324 A | * | 11/1968 | Federline | F16D 3/00 |
| | | | | 464/69 |
| 3,477,249 A | | 11/1969 | Culver | |
| 3,739,600 A | * | 6/1973 | Pere | F16D 3/00 |
| | | | | 403/73 |

(Continued)

OTHER PUBLICATIONS

Chironis, Nicholas P., Mechanisms & Mechanical Devices Sourcebook, 1991, 291, McGraw-Hill Inc., New York, NY, USA.

*Primary Examiner* — Gregory Binda
*Assistant Examiner* — Nahid Amiri

(57) ABSTRACT

A joint apparatus with two degrees of freedom and a large range of singularity-free motion is provided including a first support, a second support, a pivot coupled between the first and second supports for allowing the second support to tilt in first and second directions relative to the first support, a first linkage coupled between the first and second supports for tilting the second support in the first direction relative to the first support, and a second linkage coupled between the first and second supports for tilting the second support in the second direction relative to the first support.

20 Claims, 17 Drawing Sheets

(56) References Cited

U.S. PATENT DOCUMENTS

| | | | |
|---|---|---|---|
| 4,105,301 A * | 8/1978 | Doeg | B60R 1/025 359/877 |
| 4,643,698 A * | 2/1987 | Ehrlenspiel | F16D 3/2055 464/106 |
| 4,878,393 A * | 11/1989 | Duta | B25J 17/0275 464/106 |
| 4,976,582 A | 12/1990 | Clavel | |
| 5,330,388 A * | 7/1994 | Blanding | F16D 3/02 464/106 |
| 5,596,254 A * | 1/1997 | Vaughn | B25J 17/0275 318/568.11 |
| 5,647,581 A * | 7/1997 | Corle | B25B 5/064 269/32 |
| 5,656,905 A | 8/1997 | Tsai | |
| 5,699,695 A | 12/1997 | Canfield et al. | |
| 5,854,622 A * | 12/1998 | Brannon | G06F 3/0383 345/156 |
| 5,893,296 A | 4/1999 | Rosheim | |
| 6,086,283 A * | 7/2000 | Ziegert | G01B 5/008 403/24 |
| 6,418,811 B1 | 7/2002 | Rosheim | |
| 6,425,787 B1 * | 7/2002 | Hersom | B63C 13/00 116/28 R |
| 6,497,548 B1 * | 12/2002 | Roy | B23Q 1/5462 409/201 |
| 6,699,235 B2 | 3/2004 | Wallace et al. | |
| 7,138,981 B2 * | 11/2006 | Kim | G05G 7/02 345/156 |
| 7,472,622 B2 | 1/2009 | Isobe et al. | |
| 7,691,098 B2 | 4/2010 | Wallace et al. | |
| 8,245,595 B2 * | 8/2012 | Milenkovic | B25J 17/0258 74/490.06 |
| 8,317,141 B2 * | 11/2012 | Fischer | F16M 11/36 248/168 |
| 8,731,781 B2 * | 5/2014 | Prentice | B62D 35/02 296/180.1 |
| 9,527,588 B1 * | 12/2016 | Rollefstad | B64C 39/024 |
| 2002/0007690 A1 * | 1/2002 | Song | B23Q 1/5462 74/471 XY |
| 2009/0050191 A1 * | 2/2009 | Young | F24J 2/38 136/246 |
| 2015/0114163 A1 | 4/2015 | Rosheim | |

\* cited by examiner

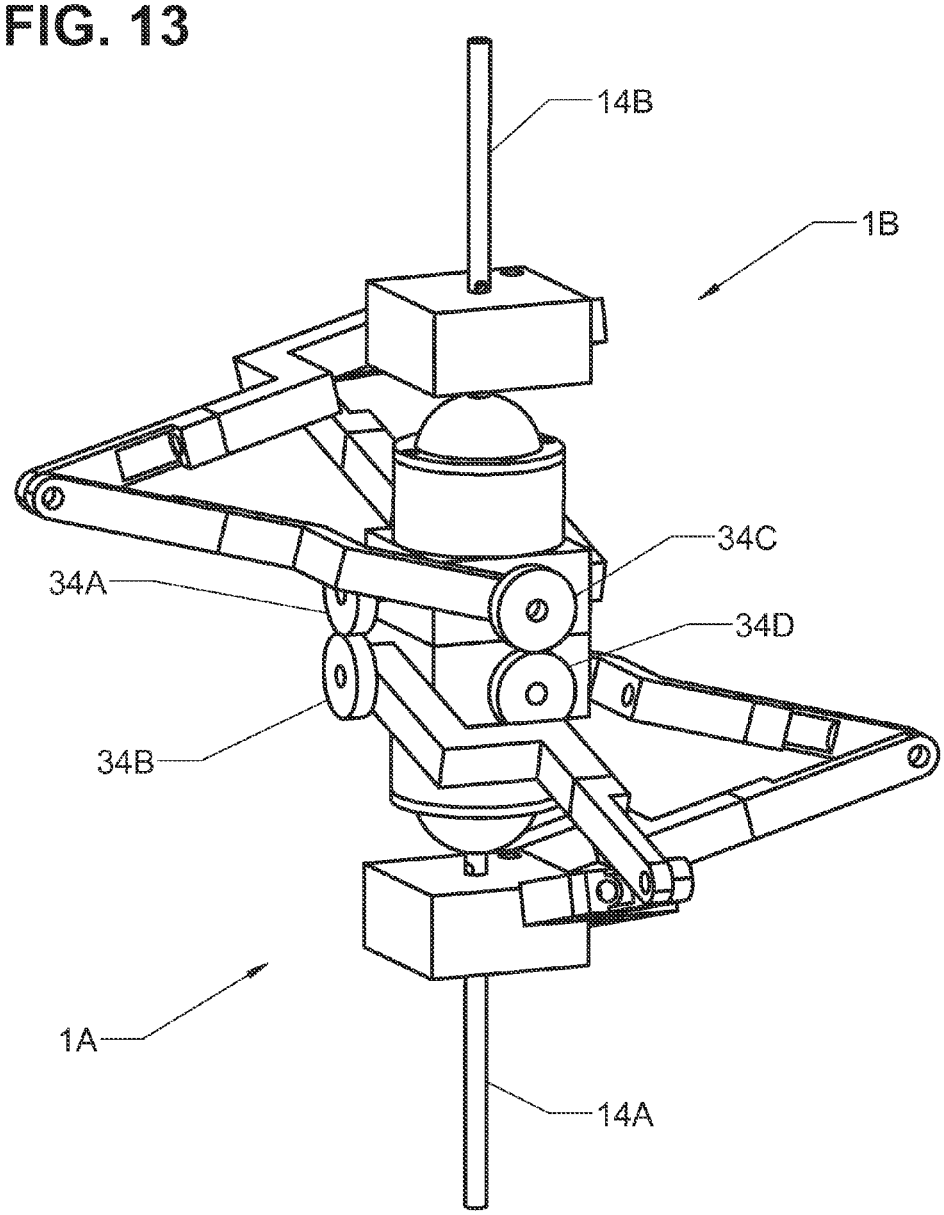

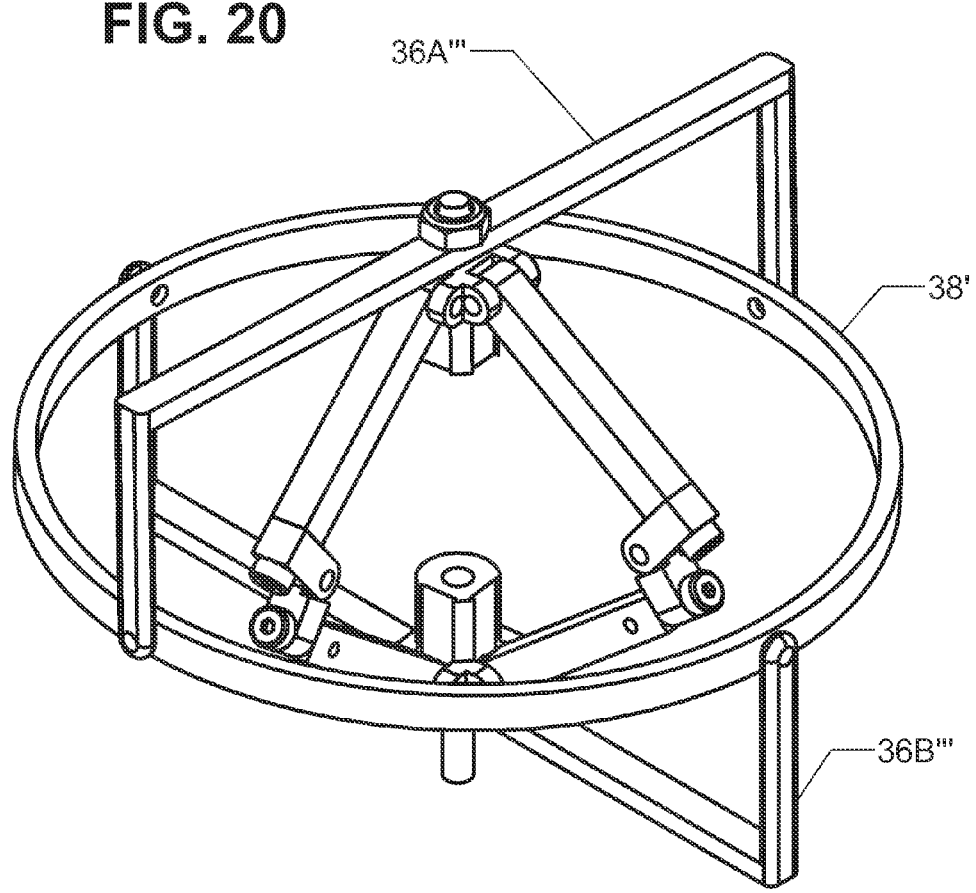

US 9,752,718 B1

TWO-AXIS JOINT

CROSS-REFERENCE TO RELATED APPLICATIONS

This application claims the benefit of U.S. Provisional Application Nos. 61/844,418, filed Jul. 9, 2013, 61/845,951, filed Jul. 12, 2013, and 61/846,070, filed Jul. 14, 2013, the entire disclosures of which are hereby incorporated by reference herein.

BACKGROUND

The invention relates to joints that connect a first mechanical component to a second mechanical component, allowing either component to be tilted around two perpendicular axes relative to the other. Such joints may be used for a variety of purposes—for example, transmitting rotational motion between shafts that are angled relative to each other, or orienting a gripper on the end of a robotic arm relative to the arm itself. One basic example of a two-axis joint is a universal joint.

Several aspects are important in two-axis joint design, such as its range of motion, complexity, robustness, and whether or not it suffers from kinematic singularities. An opportunity exists to improve upon existing joints in one or more of these areas.

SUMMARY

The opportunity described above is addressed, in one embodiment, by a joint apparatus comprising a first support, a second support, a pivot coupled between the first and second supports for allowing the second support to tilt in first and second directions relative to the first support while substantially constraining the first and second supports from translating relative to each other, a first linkage coupled between the first and second supports for tilting the second support in the first direction relative to the first support, and a second linkage coupled between the first and second supports for tilting the second support in the second direction relative to the first support.

The opportunity described above is addressed, in a second embodiment, by a joint apparatus comprising a first support, a second support, a pivot coupled between the first and second supports for allowing the second support to tilt in first and second directions relative to the first support while substantially constraining the first and second supports from translating relative to each other, a first linkage coupled between the first and second supports for tilting the second support in the first direction relative to the first support, a second linkage coupled between the first and second supports for tilting the second support in the second direction relative to the first support, a first actuator coupled to the first linkage for driving the first linkage to tilt the second support in the first direction relative to the first support, and a second actuator coupled to the second linkage for driving the second linkage to tilt the second support in the second direction relative to the first support.

DRAWINGS

Figure 11A:
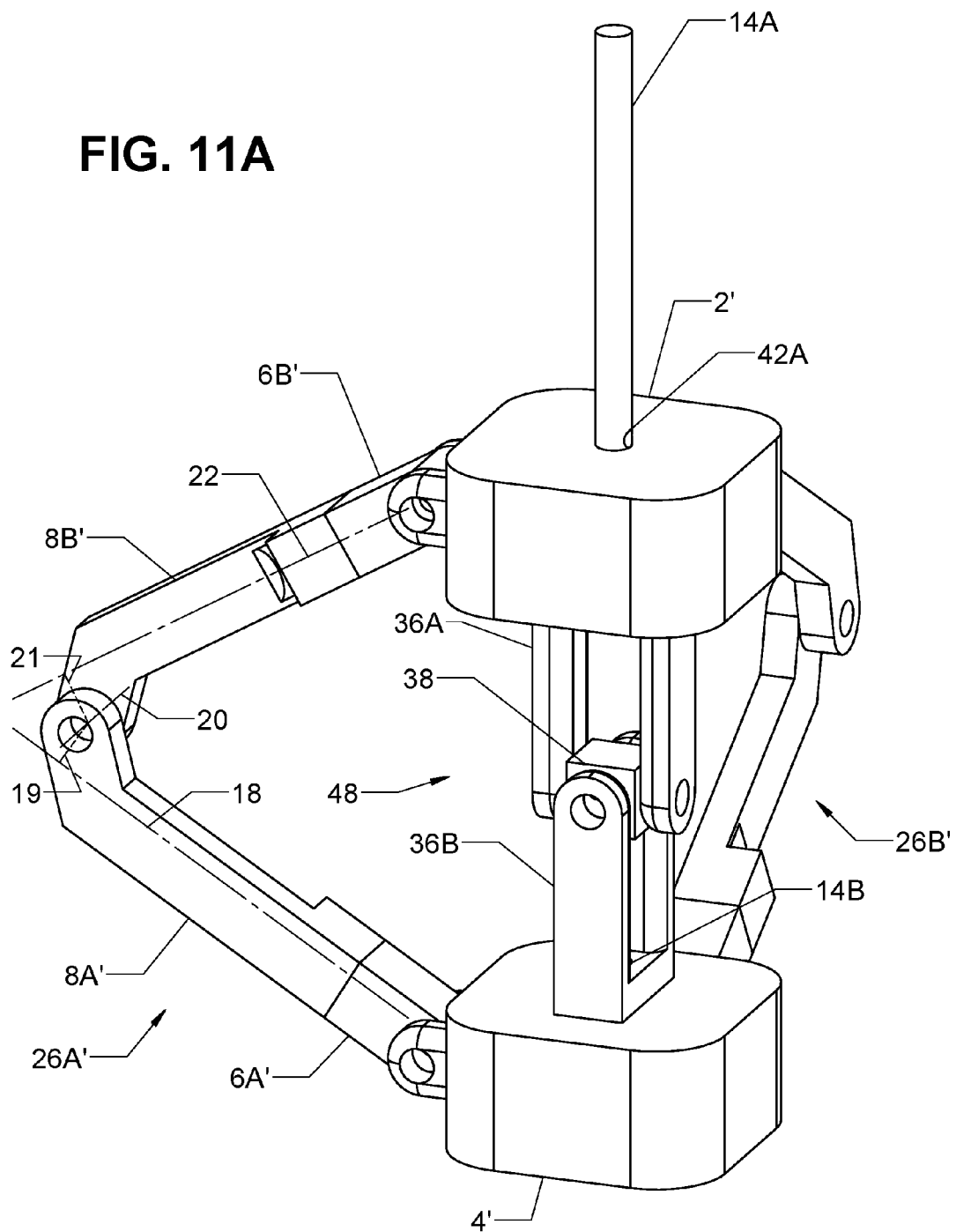
Figure 11B:
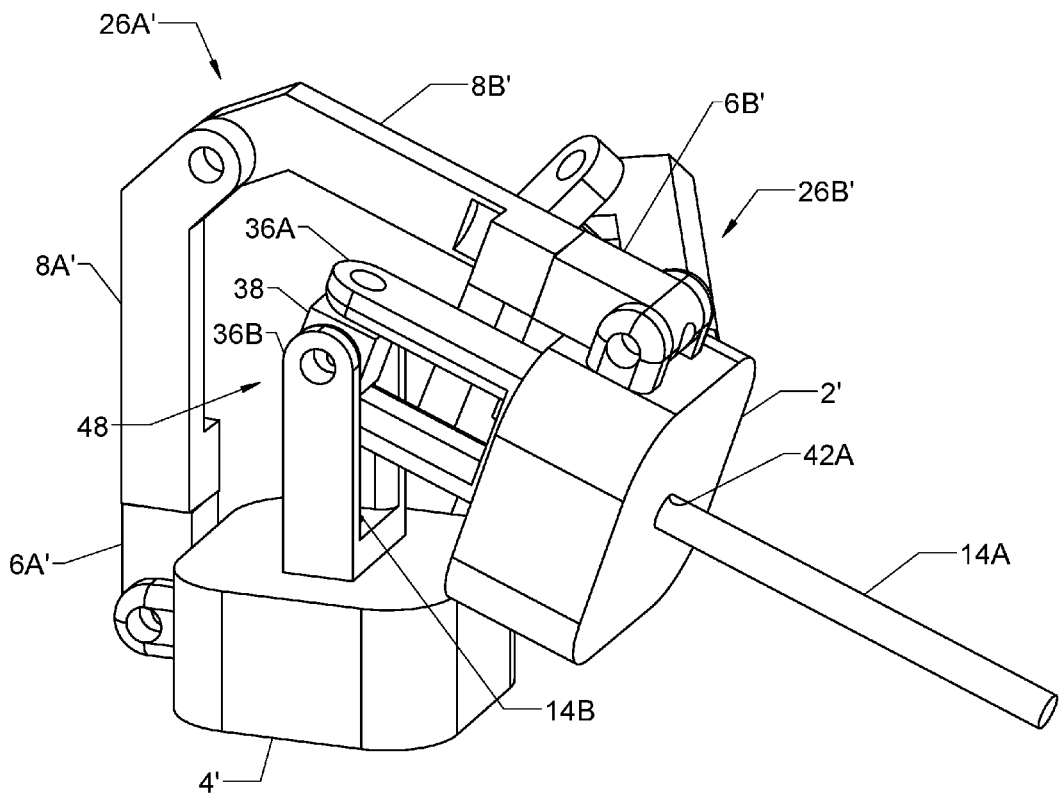
Figure 11C:
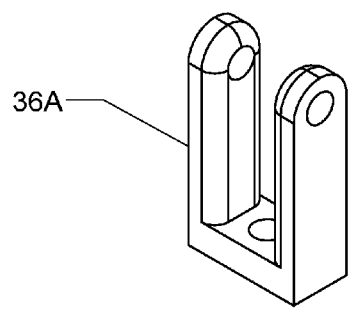

FIGS. 11A, 11B, and 11C illustrate a perspective view of a joint apparatus in accordance with a second embodiment.

Figure 12A:
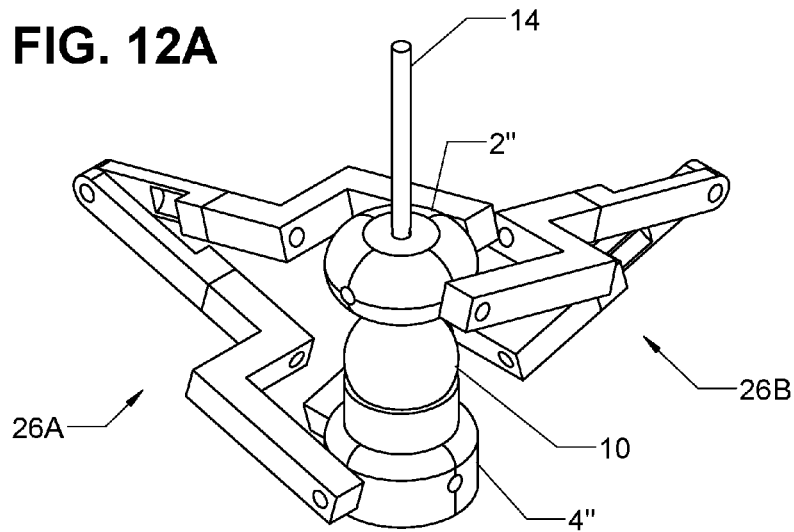

FIG. 12A illustrates a perspective view of a joint apparatus in accordance with a third embodiment.

Figure 12B:
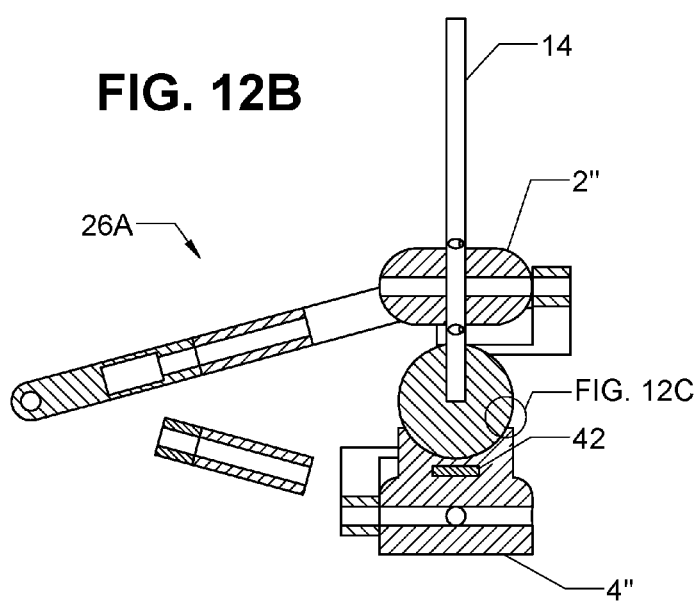

FIG. 12B illustrates a cross-sectional front view of the joint apparatus of FIG. 12A.

Figure 12C:
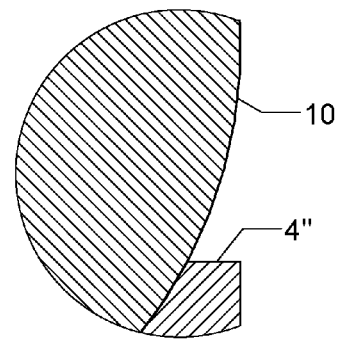

FIG. 12C illustrates a detail view of a circular area 40 of FIG. 12B.

FIG. 13 illustrates a perspective view of a joint apparatus in accordance with a fourth embodiment.

Figure 14:
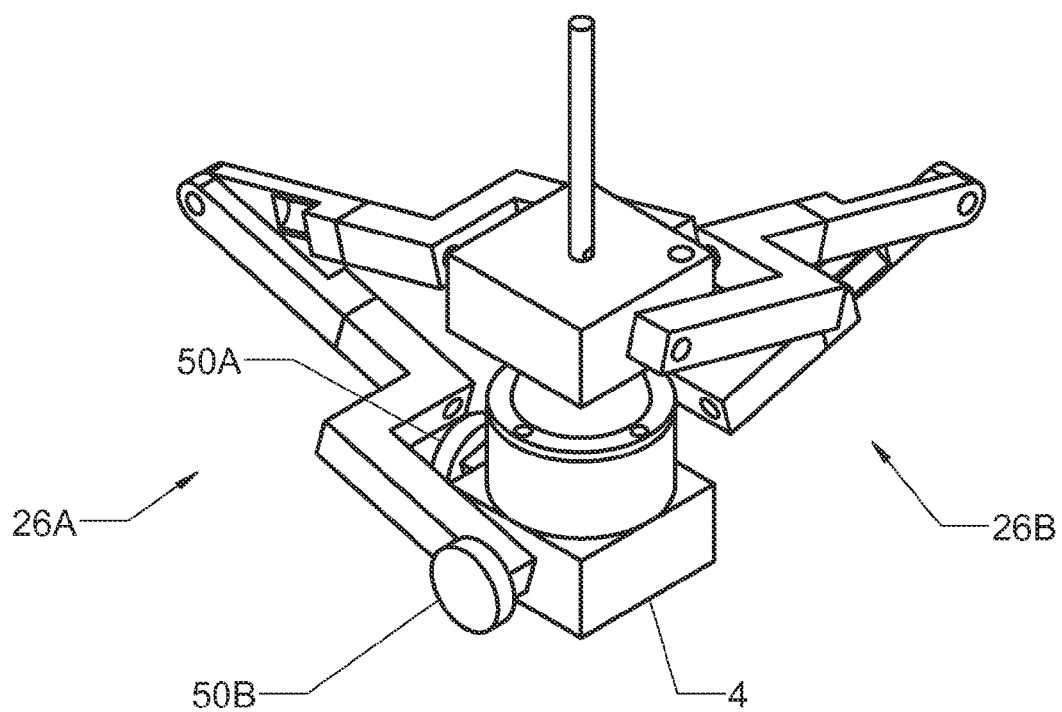

FIG. 14 illustrates a perspective view of fifth embodiment.

Figure 15:
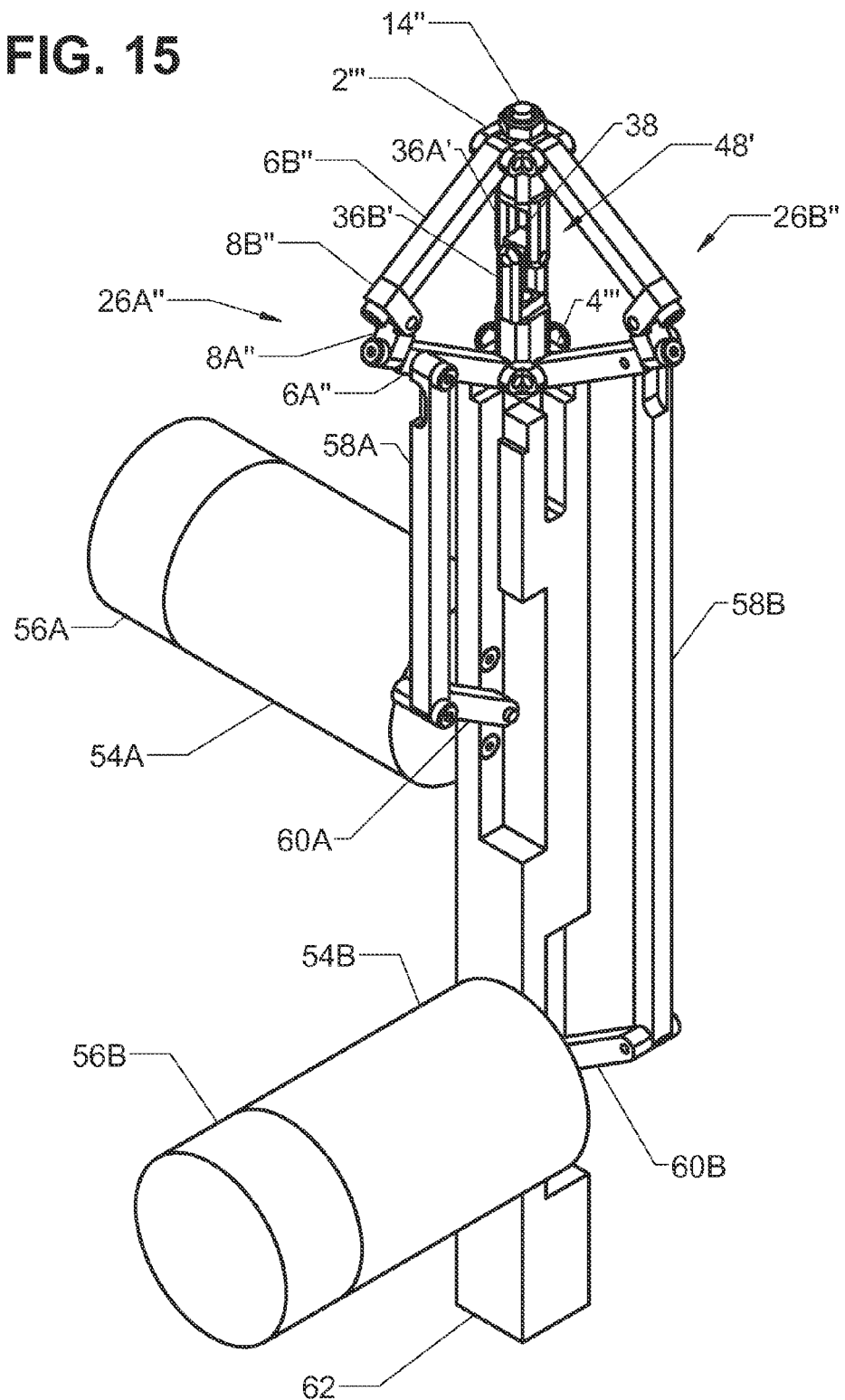

FIG. 15 illustrates a perspective view of a sixth embodiment.

Figure 16:
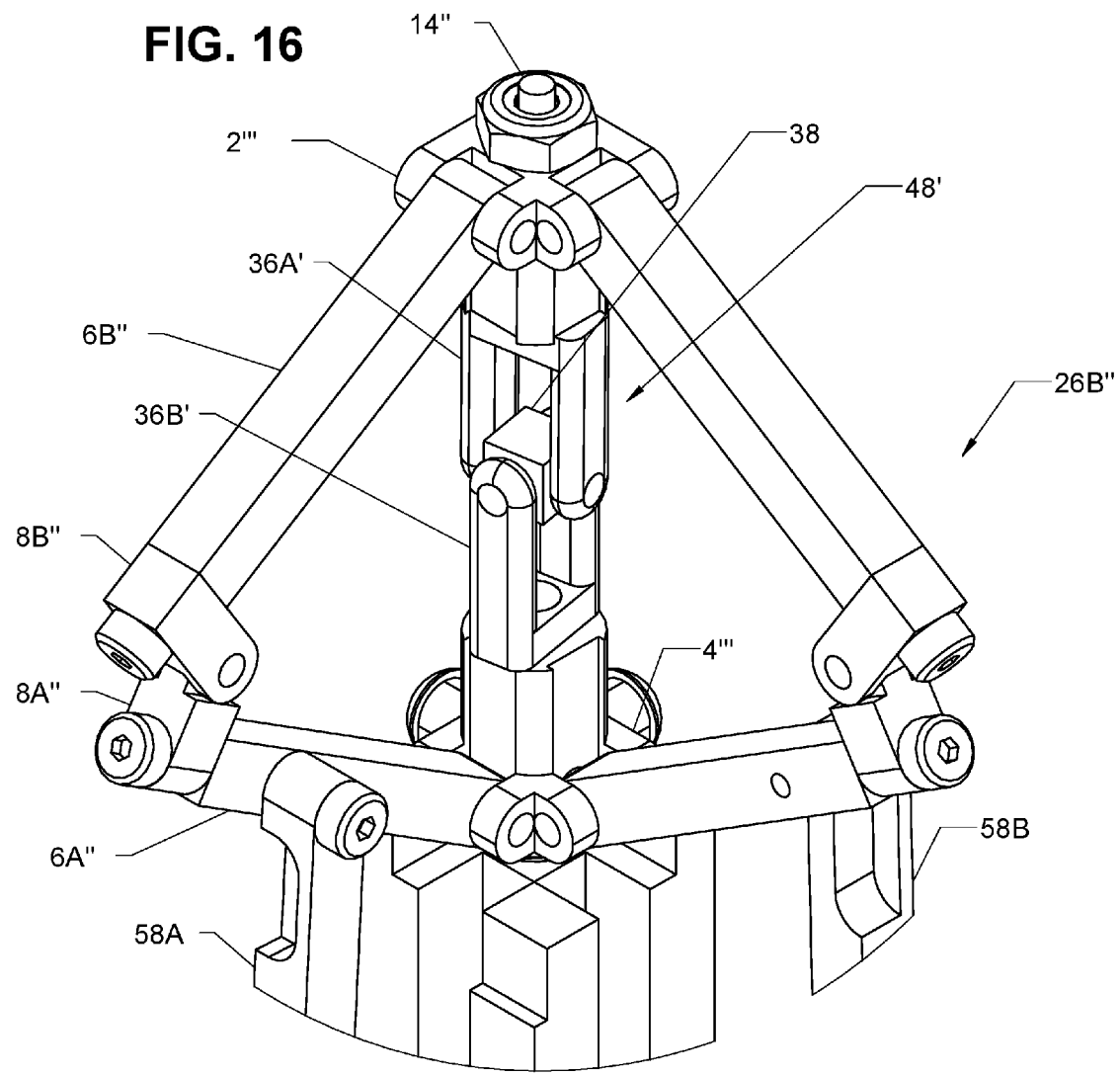

FIG. 16 illustrates a detail perspective view of the top of the embodiment shown in FIG. 15.

Figure 17:
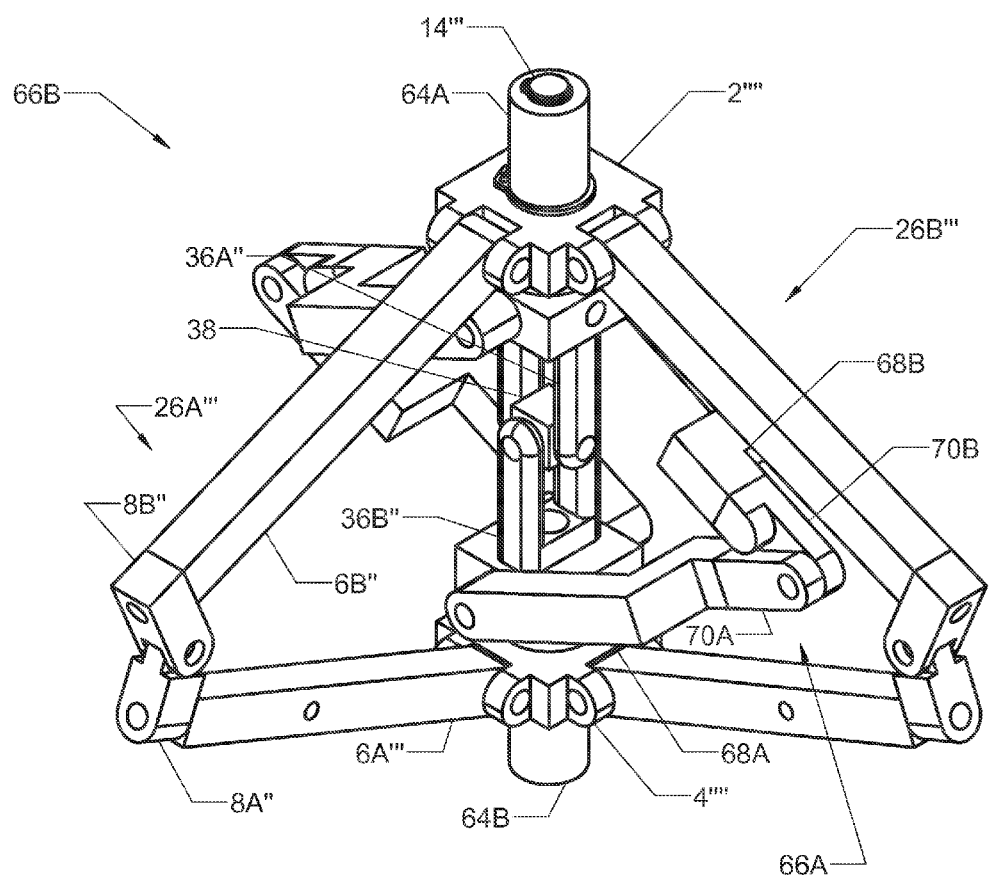

FIG. 17 illustrates a perspective view of a seventh embodiment.

Figure 18:
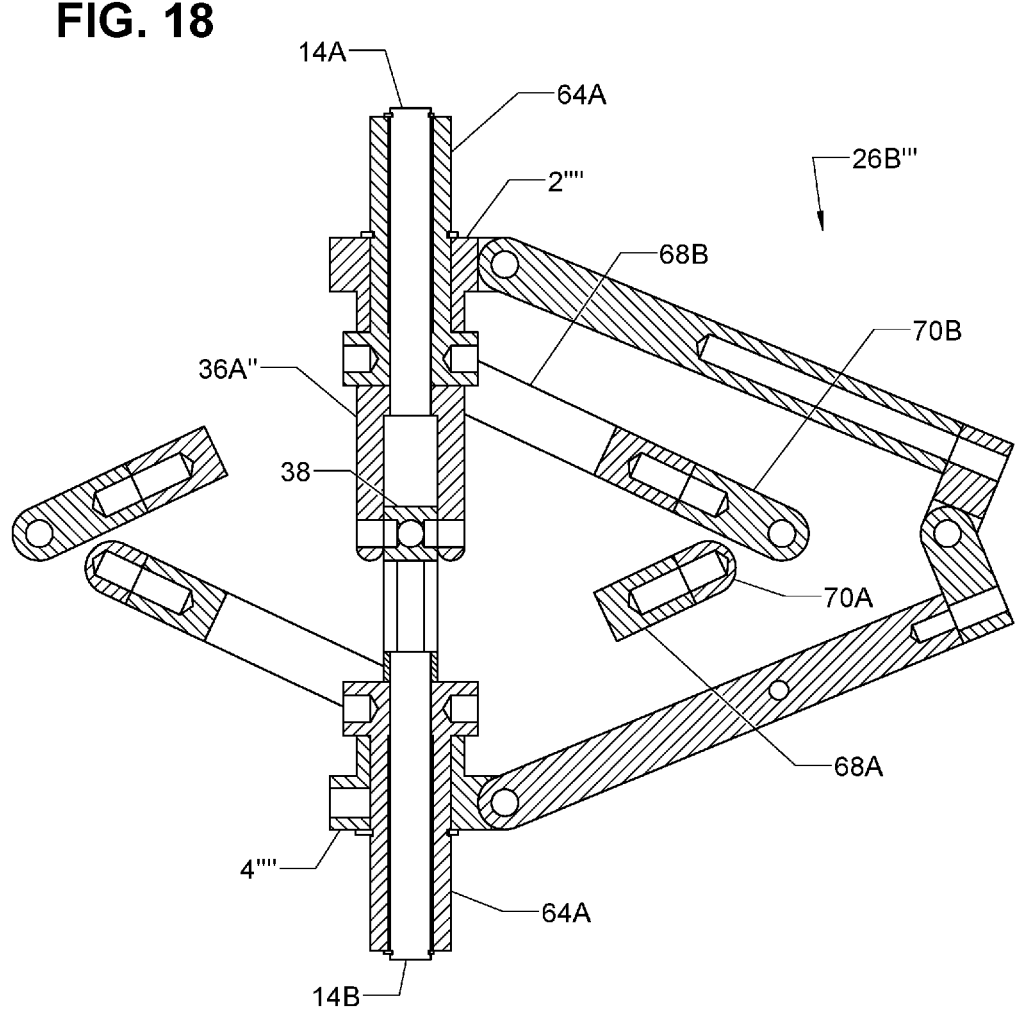

FIG. 18 illustrates a cross-sectional perspective view of the embodiment of FIG. 17.

Figure 19:
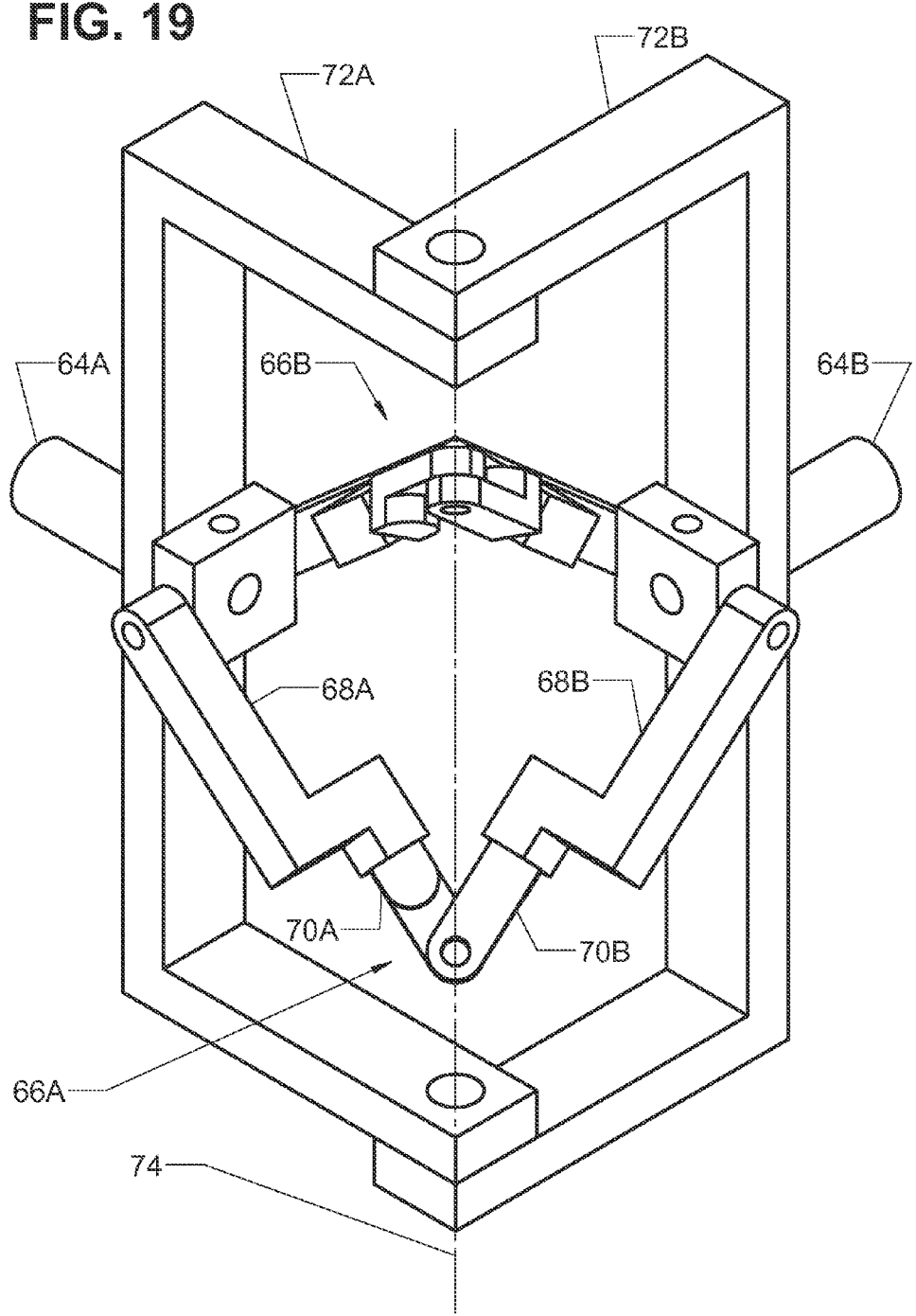

FIG. 19 illustrates a perspective view of an eighth embodiment.

FIG. 20 illustrates a perspective view of a ninth embodiment.

A component in an embodiment that has a reference numeral followed by one or more apostrophes indicates that the component corresponds to or is similar in function and/or form to a component designated by the same reference numeral alone (that is, without the apostrophes) in a previous embodiment.

While the invention is described in this disclosure by way of several example embodiments and illustrative drawings, those skilled in the art will recognize that the invention is not limited to the example embodiments described in the detailed description or shown in the drawings; instead, the full scope of the invention is defined by the appended claims.

DETAILED DESCRIPTION OF THE EMBODIMENTS

Figure 1:
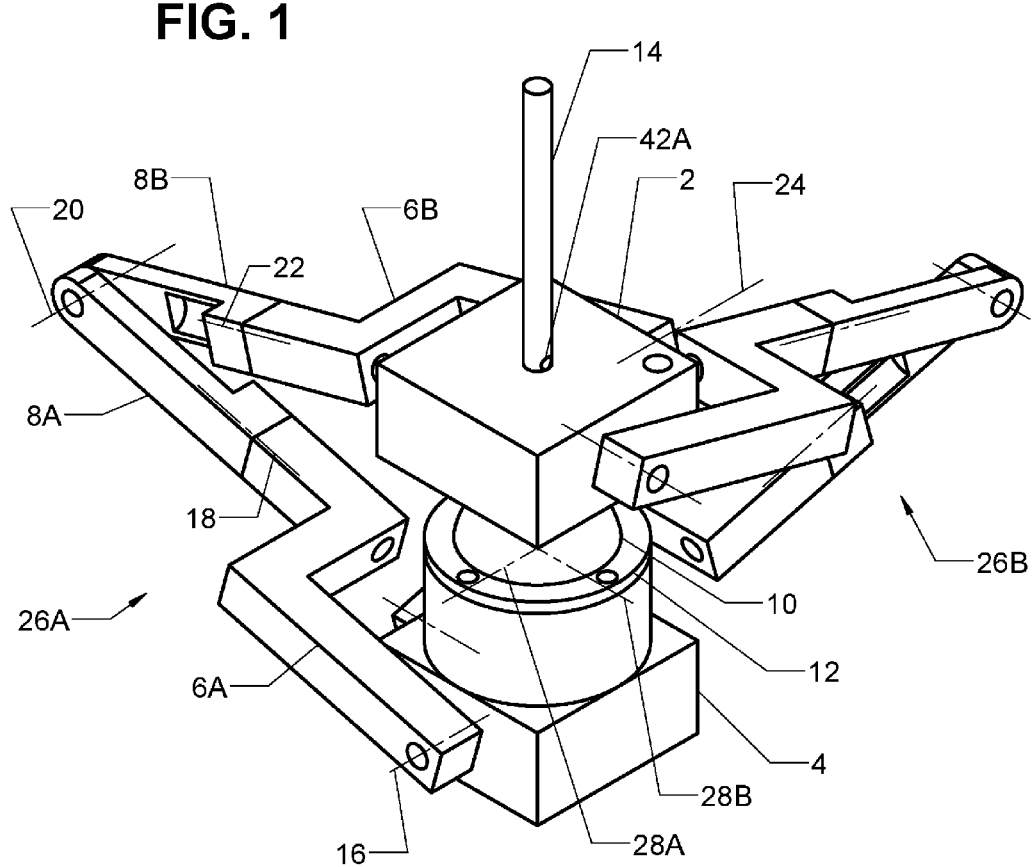
FIG. 1 illustrates a perspective view of a joint apparatus in accordance with a first embodiment.
Figure 2A:
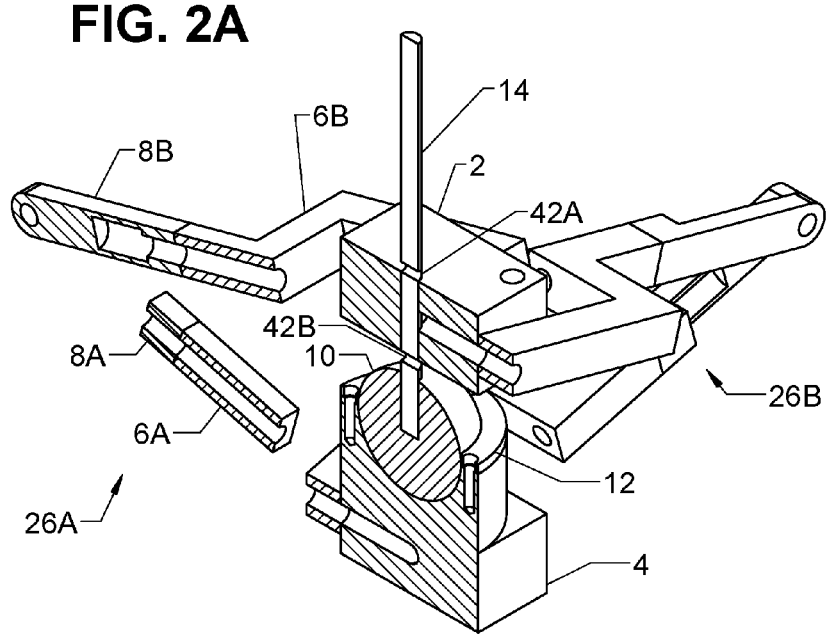
FIG. 2A illustrates a cross-sectional perspective view of the joint apparatus of FIG. 1.
Figure 2B:
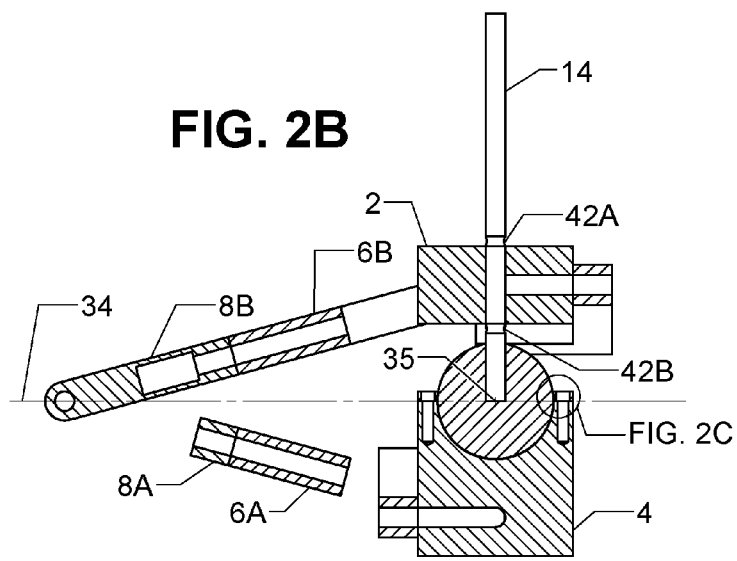
FIG. 2B illustrates a cross-sectional front view of the joint apparatus of FIG. 1.
Figure 2C:
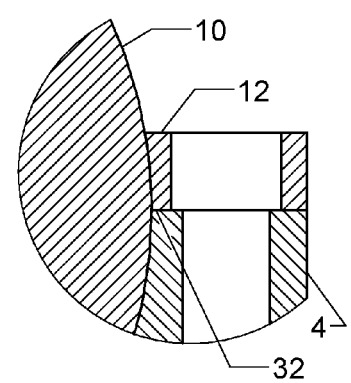
FIG. 2C illustrates a detail view of a circular area 30 of FIG. 2B.
Figure 3:
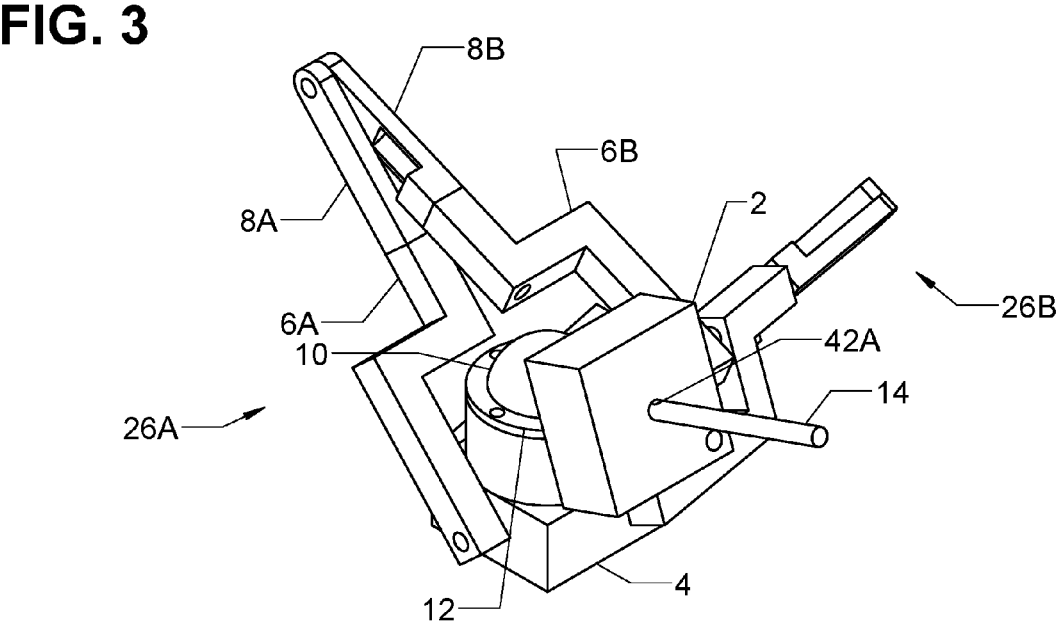
FIGS. 3-10 illustrates perspective views of the embodiment of FIG. 1 for a variety of movements of linkages 26A and 26B.
Figure 4:
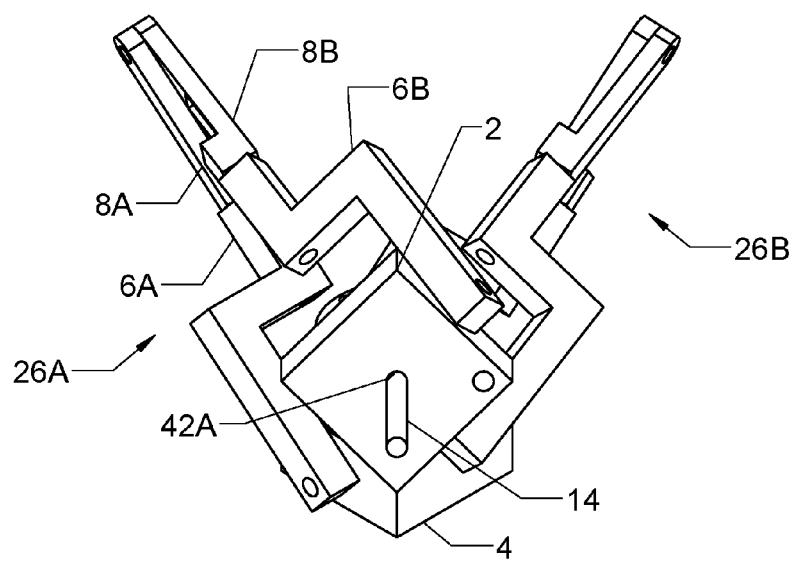
Figure 5:
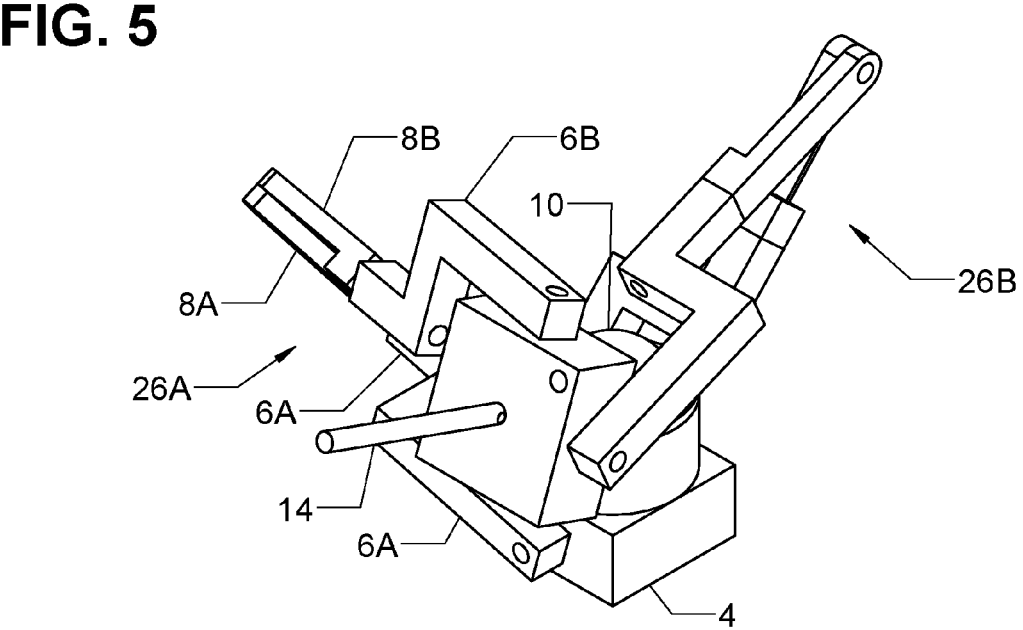
Figure 6:
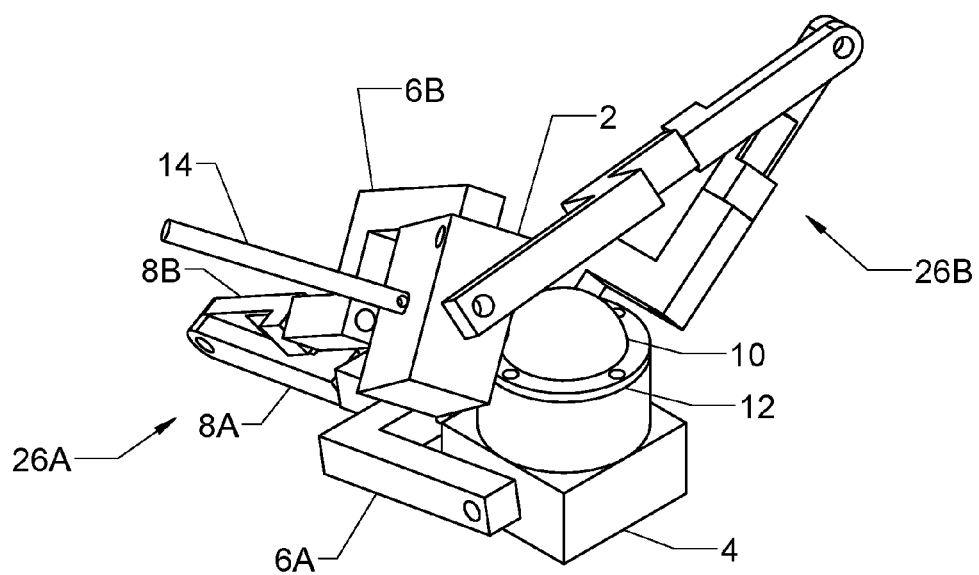
Figure 7:
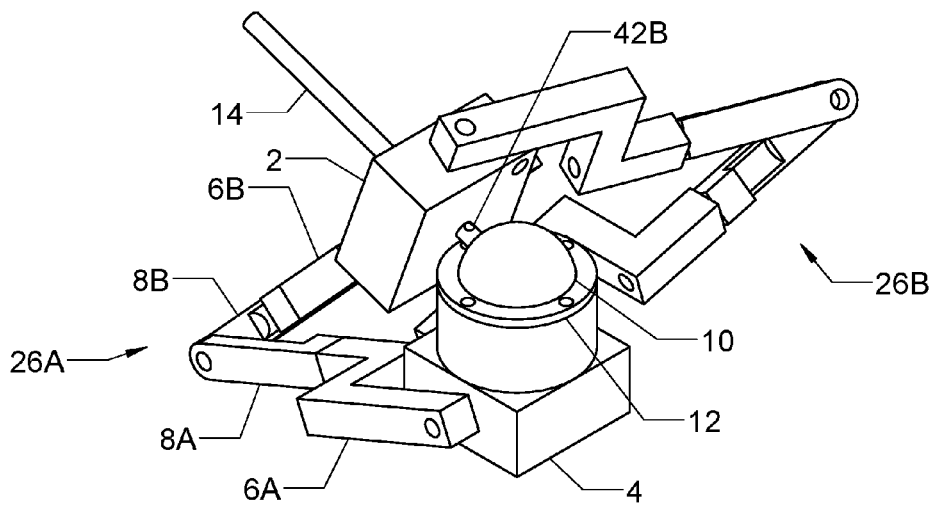
Figure 8:
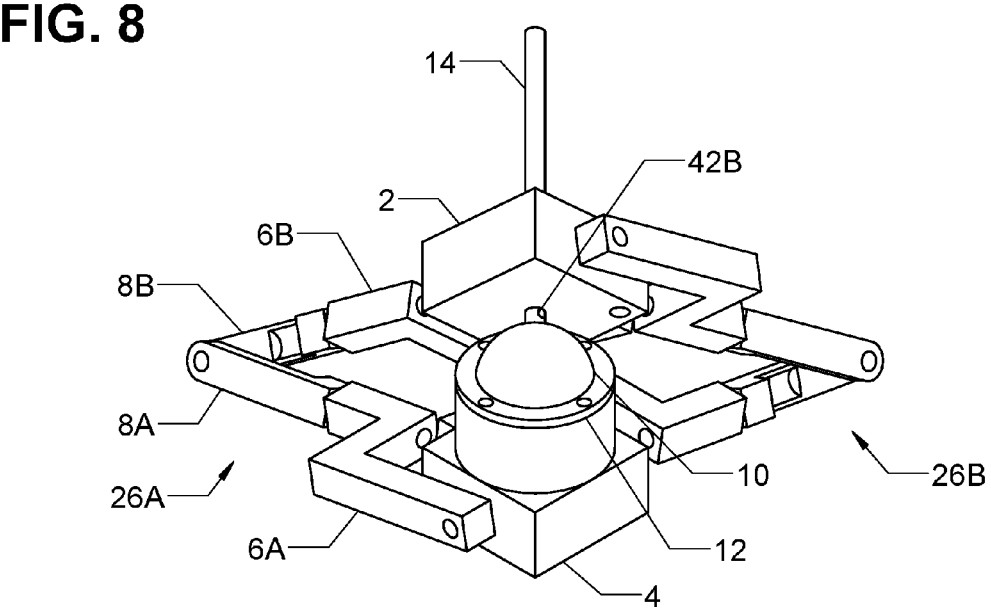
Figure 9:
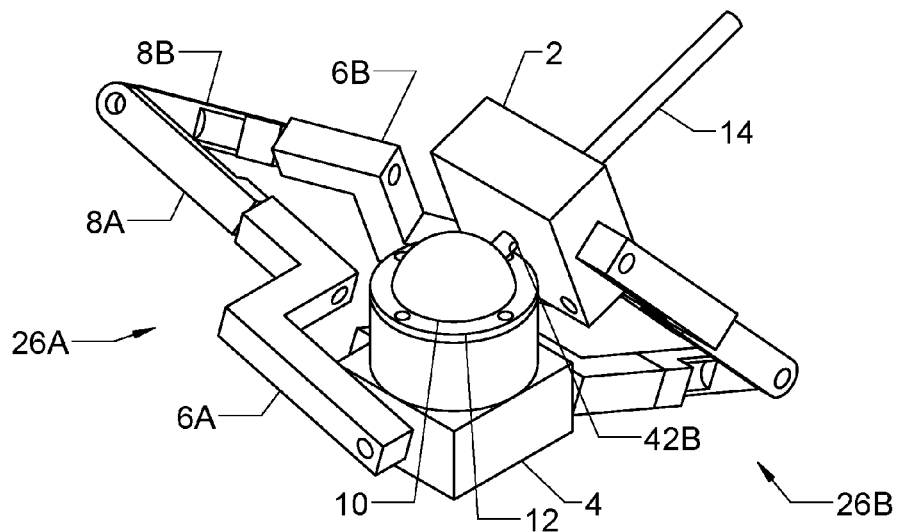
Figure 10:
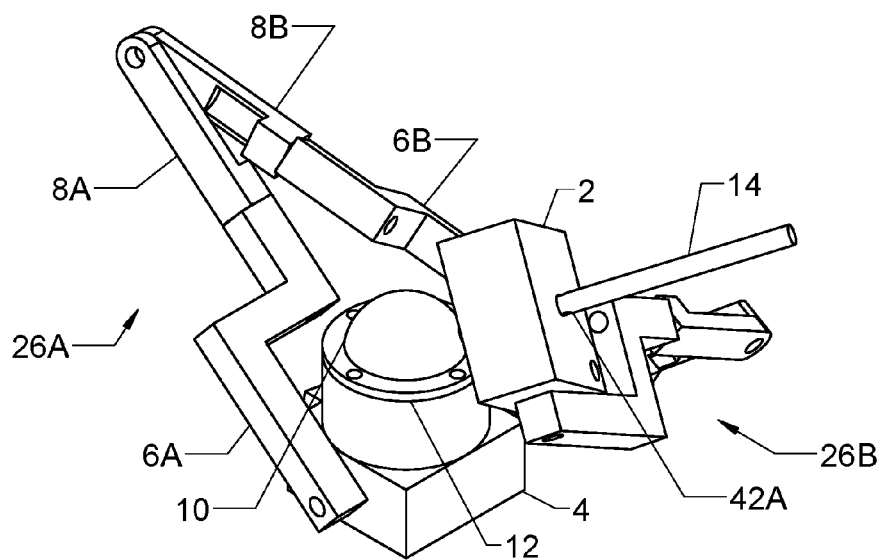

FIGS. 1, 2A, 2B and 2C show a first embodiment. A lower support 4 has a hemispherical cavity cut into its top, as shown in FIG. 2A, which receives a ball 10 to form a ball and socket joint. Ball 10 is coupled to an upper support 2 via a shaft 14, which passes through a hole in upper support 2. Shaft 14 is retained on both sides of support 2 by dowel pins (not shown) that are press-fit into holes 42A and 42B, as shown in FIG. 1. Linkage 26A in this embodiment comprises links 6A and 6B and middle links 8A and 8B. Link 6A is coupled via a shoulder screw (not shown) to lower support 4 such that it can rotate around an axis 16 relative to lower support 4. Link 6A is coupled via a shoulder screw (not shown) to middle link 8A such that middle link 8A can rotate around an axis 18 relative to link 6A. Middle link 8A is coupled via a shoulder screw (not shown) to a second middle link 8B such that middle links 8A and 8B can rotate relative to each other around an axis 20. As shown in FIG. 2B, it is preferable for axis 20 of linkage 26A (as well as the corresponding axis of linkage 26B) to lie on a plane 34 that intersects with the pivot point 35 of the joint, which in this embodiment is the center of ball 10. A second middle link 8B is coupled via a shoulder screw (not shown) to link 6B such that link 6B can rotate around an axis 22 relative to middle link 8B. Link 6B is coupled to upper support 2 via a shoulder screw (not shown) such that link 6B can rotate around an axis 24 relative to upper support 2. Linkage 26B is substantially identical in structure to linkage 26A, but offset 90 degrees around the joint. As shown in FIG. 2C, a retainer 12 holds ball 10 into the cavity in lower support 4. Preferably, in this embodiment, the center of ball 10 corresponds with the top surface 32 of lower support 4. Therefore, ball 10 can readily be inserted and removed into the cavity of lower support 4. Retainer 12 is held down to lower support 4 via 4 screws (not shown).

Referring again to FIG. 1, moving linkage 26A causes support 2 to tilt. If linkage 26A is moved alone, it causes support 2 to substantially rotate around an axis 28A. Similarly, moving linkage 26B causes support 2 to tilt. If linkage 26B is moved alone, it causes support 2 to substantially rotate around an axis 28B. If linkages 26A and 26B are moved together, support 2 substantially tilts between axes 28A and 28B.

FIGS. 3-10 illustrates a sequence of tilting caused by a variety of movements of linkages 26A and 26B.

FIGS. 11A, 11B, and 11C illustrate a second embodiment incorporating a universal joint or gimbal 48 as a pivot between supports 2' and 4'. Universal joint 48 comprises a first fork 36A, a second fork 36B (substantially identical to fork 36A), and a spider 38. Fork 36A is rotably connected to upper support 2' via shaft 14A. Similarly, Fork 36B is rotably connected to lower support 4' via shaft 14B, which is secured by a dowel pin (not shown) on the opposite side of lower support 4'. Linkage 26A' is comprised of links 6A' and 6B' and middle links 8A' and 8B', which are coupled substantially similarly to their counterparts in the embodiment of FIG. 1, with the exception of the position of attachment to upper support 2' and lower support 4'. As shown in FIG. 11A, the bend in links 8A' and 8B' results in a distance 19 between axes 18 and 20 and a distance 21 between axes 20 and 22. Linkage 26B' is substantially identical in structure to linkage 26A'. In operation, as shown in FIG. 11B, upper support 2' can be tilted past 90 degrees. Universal joint 48 may rotate as needed to accommodate such motion. Fork 36A preferably has rounded inside edges, as shown in FIG. 11C, to allow universal joint 48 to rotate as needed to more readily accommodate tilting of upper support 2' relative to lower support 4'.

FIGS. 12A, 12B, and 12C illustrate a third embodiment. A lower support 4" functions similarly to support 4 of the embodiment of FIG. 1, but engages ball 10 at a lower position (as shown in FIG. 12C) to allow support 2" to tilt at greater angles than the embodiment of FIG. 1. A magnet 42, as shown in FIG. 12B, is embedded in support 4" to retain ball 10 (which is ferrous and magnetic) via magnetic attraction.

FIG. 13 illustrates a fourth embodiment comprising joints 1A and 1B connected back-to-back, each substantially identical to the embodiment shown in FIG. 1. Gears 34A and 34B mesh and constrain the linkage of joint 1B sharing the same axis as Gear 34B to rotate in the opposite direction relative to the linkage of joint 1A coupled to gear 34B. Gears 34C and 34D similarly constrain the two remaining linkages. In operation, when shaft 14A of joint 1A is held fixed, shaft 14B of joint 1B can tilt at a greater angle relative to shaft 14A than shaft 14 can tilt relative to lower support 4 in the first embodiment.

FIG. 14 illustrates a fifth embodiment comprising the embodiment of FIG. 1 with electric motors 50A and 50B driving linkages 26B and 26A respectively, with the shafts of motors 50A and 50B fixed to support 4 and the bodies of motors 50A and 50B fixed to linkages 26B and 26A respectively. In operation, motors 50A and 50B drive linkages 26B and 26A to rotate respectively.

FIGS. 15 and 16 illustrate a perspective view of a sixth embodiment comprising an upper support 2" connected via linkages 26A" and 26B" to lower support 4'''. A link 6A" of linkage 26A" is rotated by a pushrod 58A, which is connected to a crank arm 60A. A motor 54A rotates crank arm 60A, which is mounted to its shaft. Angular position is measured by a rotary encoder 56A mounted to the shaft of motor 54A. Similarly, pushrod 58B is manipulated by crank arm 60B, which is rotated by a motor 54B. The rotation of crank arm 60B is measured by a rotary encoder 56B. Support 62 mounts motors 54A and 54B and is connected at its top to lower support 4'''.

FIGS. 17 and 18 illustrates a seventh embodiment that allows rotation of an upper component 64A when a lower component 64B is rotated. Lower component 64B is rotably attached to a lower support 4''''. A fork 36B" is rotably attached to lower component 64B. Similarly, upper component 64A is rotably attached to upper support 2''''. A fork 36A" is rotably attached to upper component 64B. Fork 36A" is rotably attached to spider 38, which is rotably attached to fork 36B". Together, forks 36A, 36B, and spider 38 form a joint similar to joint 48. A linkage 66A includes 68A, 70A, 70B, and 68B. When lower component 64B is rotated, torque is transmitted through 66A to upper component 64A.

FIG. 19 illustrates an eighth embodiment that allows rotation of upper component 64A to be transmitted to lower component 64B through linkages 66A and 66B. Supports 72A and 72B rotably support upper and lower components 64A and 64B respectively. Support 72A rotates relative to support 72B around axis 74.

FIG. 20 illustrates a ninth embodiment that is similar in structure to the embodiment of FIG. 11A, except that joint 48 is replaced with forks 36A''' and 36B''' and spider 38'.

Embodiments other than those described above or shown in the drawings will become apparent to those skilled in the art with the benefit of this disclosure. Accordingly, the invention is not limited to the example embodiments described in the detailed description or shown in the drawings; instead, the full scope of the invention is defined by the appended claims.

The invention claimed is:

1. A joint apparatus comprising:
    a first support;
    a second support;
    a pivot coupled between the first and second supports for allowing the second support to rotate around first and second perpendicular axes relative to the first support while constraining the first and second supports from translating relative to each other;
    a first link coupled to the first support such that the first link can rotate about a third axis relative to the first support;
    a second link coupled to the first link such that the second link can rotate about a fourth axis relative to the first link, the fourth axis being angled relative to the third axis;
    a third link coupled to the second link such that the third link can rotate about a fifth axis relative to the second link, the fifth axis being angled relative to fourth axis;

a fourth link coupled to the third link such that the fourth link can rotate about a sixth axis relative to the third link, the sixth axis being angled relative to the fifth axis, the fourth link also coupled to the second support such that the fourth link can rotate about a seventh axis relative to the second support, the seventh axis being angled relative to the sixth axis;

a fifth link coupled to the first support such that the fifth link can rotate about an eighth axis relative to the first support;

a sixth link coupled to the fifth link such that the sixth link can rotate about a ninth axis relative to the fifth link, the ninth axis being angled relative to the eighth axis;

a seventh link coupled to the sixth link such that the seventh link can rotate about a tenth axis relative to the sixth link, the tenth axis being angled relative to ninth axis; and an eighth link coupled to the seventh link such that the eighth link can rotate about an eleventh axis relative to the seventh link, the eleventh axis being angled relative to the tenth axis, the eighth link also coupled to the second support such that the second support can rotate about a twelfth axis relative to the eighth link, the twelfth axis being angled relative to the eleventh axis.

2. The joint apparatus of claim 1, wherein the pivot is a ball and socket joint.

3. The joint apparatus of claim 2, wherein the ball and socket joint comprises a ball and a socket, the socket engaging less than half of the ball, the ball being held into the socket by a magnet coupled to the socket.

4. The joint apparatus of claim 1, wherein the pivot is a gimbal.

5. The joint apparatus of claim 4, wherein the gimbal comprises:
   a first fork coupled to the first support;
   a second fork coupled to the second support; and
   a spider coupled between the first and second forks such that the spider can rotate relative to the first fork about a thirteenth axis and the spider can rotate relative to the second fork about a fourteenth axis,
   wherein the thirteenth and fourteenth axes intersect and are perpendicular to each other.

6. The joint apparatus of claim 5, wherein the first fork can rotate relative to the first support and the second fork can rotate relative to the second support.

7. The joint apparatus of claim 1, further comprising:
   a first motor coupled to the first link for driving the first link to rotate relative to the first support; and
   a second motor coupled to the second linkage for driving the second link to rotate relative to the first support.

8. The joint apparatus of claim 7, wherein the first motor is an electric motor.

9. The joint apparatus of claim 1, wherein the distance from the third axis to the fifth axis is equal to the distance from the fifth axis to the seventh axis.

10. The joint apparatus of claim 9, wherein the distance from the eighth axis and the tenth axis is equal to the distance from the tenth axis to the twelfth axis.

11. The joint apparatus of claim 1, wherein the fourth axis is perpendicular to the third axis.

12. The joint apparatus of claim 11, wherein the fifth axis is perpendicular to the fourth axis.

13. The joint apparatus of claim 12, wherein the sixth axis is perpendicular to the fifth axis.

14. The joint apparatus of claim 13, wherein the seventh axis is perpendicular to the sixth axis.

15. The joint apparatus of claim 14, wherein the first and second axes intersect.

16. The joint apparatus of claim 15, wherein the first, second, third, and fourth links comprise a first linkage, the fifth, sixth, seventh, and eighth links comprise a second linkage, and the first and second linkages are separated by an approximately 90 degree angle around the pivot.

17. The joint apparatus of claim 15, wherein the fifth and tenth axes lie in the same plane.

18. The joint apparatus of claim 1, wherein the fifth and tenth axes lie in the same plane.

19. The joint apparatus of claim 1, wherein the third and eighth axes are perpendicular to each other and the seventh and twelfth axes are perpendicular to each other.

20. The joint apparatus of claim 1, wherein the fifth axis is separated by a first distance from the fourth axis and the sixth axis is separated by a second distance from the fifth axis.

* * * * *